US009224084B2

(12) United States Patent
Warther (10) Patent No.: US 9,224,084 B2
(45) Date of Patent: Dec. 29, 2015

(54) SMART DEVICE PROGRAMMABLE ELECTRONIC LUGGAGE TAG

(71) Applicant: Vanguard Identification Systems, Inc., West Chester, PA (US)

(72) Inventor: Richard O. Warther, West Chester, PA (US)

(73) Assignee: Vanguard Identification Systems, Inc., West Chester, PA (US)

( * ) Notice: Subject to any disclaimer, the term of this patent is extended or adjusted under 35 U.S.C. 154(b) by 0 days.

(21) Appl. No.: 14/516,204

(22) Filed: Oct. 16, 2014

(65) Prior Publication Data

US 2015/0122893 A1    May 7, 2015

Related U.S. Application Data

(63) Continuation-in-part of application No. 14/207,836, filed on Mar. 13, 2014, which is a continuation of application No. 13/290,559, filed on Nov. 7, 2011, now abandoned, which is a continuation-in-part of (Continued)

(51) Int. Cl.
*G06K 19/00* (2006.01)
*G06K 19/077* (2006.01)
(Continued)

(52) U.S. Cl.
CPC ...... *G06K 19/07716* (2013.01); *G06K 7/10366* (2013.01); *G06K 19/04* (2013.01); *G06K 19/06028* (2013.01); *G06K 19/06187* (2013.01); *G06K 19/077* (2013.01);
(Continued)

(58) Field of Classification Search
USPC .................................................. 235/487, 492
See application file for complete search history.

(56) References Cited

U.S. PATENT DOCUMENTS 4,861,644 A    8/1989    Young et al.
4,978,146 A    12/1990    Warther et al.
(Continued)

FOREIGN PATENT DOCUMENTS

EP    1870849 A2    12/2007
EP    2431930 A1    3/2012
(Continued)

OTHER PUBLICATIONS

The Future of Electronic Paper. Oct. 15, 2007. 9 pages. http://thefutureofthings.com/articles/1000/the-future-of-electronic-paper.html by The Future of Things.
(Continued)

*Primary Examiner* — Matthew Mikels
(74) *Attorney, Agent, or Firm* — Panitch Schwarze Belisario & Nadel LLP (57) ABSTRACT

A programmable luggage tag has a rigid, flat case containing a bistable visual display assembly, a BLE, NFC or other comparable short range, radio receiver and a processor configured to convert short range radio image control signals detected by the receiver into commands to modify the image on the display. A manual input switch on the case activates circuitry with a battery in the case for a time sufficient to receive the control signals and modify the image. A multi-layer plastic, resiliently flexible thin flap is fixed with the case extending away from the case generally in a common plane with the case. The flap includes an encapsulated passive RFID transponder and mounting holes distal to the housing permitting the tag to be resiliently secured to the handle of a piece of luggage.

24 Claims, 7 Drawing Sheets

Related U.S. Application Data application No. 12/960,941, filed on Dec. 6, 2010, now Pat. No. 8,052,061, which is a continuation-in-part of application No. 12/416,637, filed on Apr. 1, 2009, now Pat. No. 7,845,569, and a continuation-in-part of application No. 29/497,596, filed on Jul. 25, 2014.

(60) Provisional application No. 61/891,666, filed on Oct. 16, 2013, provisional application No. 61/920,574, filed on Dec. 24, 2013, provisional application No. 61/942,917, filed on Feb. 21, 2014, provisional application No. 61/970,137, filed on Mar. 25, 2014, provisional application No. 62/016,874, filed on Jun. 25, 2014, provisional application No. 62/034,563, filed on Aug. 7, 2014, provisional application No. 62/049,032, filed on Sep. 11, 2014.

(51) Int. Cl.
  *G06K 7/10* (2006.01)
  *G06K 19/04* (2006.01)
  *G06K 19/06* (2006.01)
  *G06K 19/12* (2006.01)
  *G06K 19/14* (2006.01)

(52) U.S. Cl.
  CPC ... *G06K 19/07707* (2013.01); *G06K 19/07726* (2013.01); *G06K 19/07749* (2013.01); *G06K 19/07758* (2013.01); *G06K 19/12* (2013.01); *G06K 19/14* (2013.01)

(56) References Cited

U.S. PATENT DOCUMENTS

| | | | |
|---|---|---|---|
| 5,233,167 A | 8/1993 | Markman et al. | |
| 5,340,968 A | 8/1994 | Watanabe et al. | |
| 5,366,249 A | 11/1994 | Diemert | |
| 5,478,991 A | 12/1995 | Watanabe et al. | |
| 5,495,981 A | 3/1996 | Warther | |
| 5,581,257 A | 12/1996 | Greene et al. | |
| 5,693,766 A | 12/1997 | Bradbury | |
| 5,743,567 A | 4/1998 | Warther | |
| 5,769,457 A | 6/1998 | Warther | |
| 5,838,253 A | 11/1998 | Wurz et al. | |
| 5,863,076 A | 1/1999 | Warther | |
| 5,912,981 A | 6/1999 | Hansmire et al. | |
| 5,973,600 A | 10/1999 | Mosher, Jr. | |
| 5,979,941 A | 11/1999 | Mosher, Jr. et al. | |
| 6,010,159 A | 1/2000 | Warther | |
| 6,039,356 A | 3/2000 | Warther et al. | |
| 6,050,622 A | 4/2000 | Gustafson | |
| 6,089,611 A | 7/2000 | Blank | |
| 6,290,138 B1 | 9/2001 | Ohno et al. | |
| 6,305,716 B1 | 10/2001 | Warther et al. | |
| 6,325,294 B2 | 12/2001 | Tuttle et al. | |
| 6,484,947 B1 | 11/2002 | Miyata | |
| 6,588,658 B1 | 7/2003 | Blank | |
| 6,693,544 B1 | 2/2004 | Hebbecker | |
| 6,769,718 B1 | 8/2004 | Warther et al. | |
| 6,879,424 B2 | 4/2005 | Vincent et al. | |
| 6,942,155 B1 | 9/2005 | Stewart et al. | |
| 6,994,262 B1 | 2/2006 | Warther | |
| 7,153,620 B2 | 12/2006 | Aylward et al. | |
| 7,193,504 B2 | 3/2007 | Carrender et al. | |
| 7,204,652 B2 | 4/2007 | Warther | |
| 7,225,993 B2 | 6/2007 | Warther | |
| 7,233,250 B2 | 6/2007 | Forster | |
| 7,236,151 B2 | 6/2007 | Doane et al. | |
| 7,377,445 B1 | 5/2008 | Stewart et al. | |
| 7,479,940 B2 | 1/2009 | Marhefka | |
| 7,584,896 B2 | 9/2009 | Warther | |
| 7,845,569 B1 * | 12/2010 | Warther et al. | 235/492 |
| 7,909,955 B2 | 3/2011 | Warther | |
| 8,052,061 B2 * | 11/2011 | Warther | 235/492 |
| 2003/0173408 A1 | 9/2003 | Mosher et al. | |
| 2004/0119593 A1 | 6/2004 | Kuhns | |
| 2005/0108912 A1 | 5/2005 | Bekker | |
| 2006/0032907 A1 | 2/2006 | Zercher | |
| 2006/0124757 A1 | 6/2006 | Warther | |
| 2007/0152826 A1 | 7/2007 | August et al. | |
| 2008/0030017 A1 | 2/2008 | Warther | |
| 2008/0099723 A1 | 5/2008 | Nose et al. | |
| 2008/0273023 A1 | 11/2008 | Nose et al. | |
| 2009/0009412 A1 | 1/2009 | Warther | |
| 2009/0040048 A1 | 2/2009 | Locker et al. | |
| 2010/0065648 A1 | 3/2010 | Warther | |
| 2011/0279242 A1 | 11/2011 | Krawczewicz | |
| 2012/0062367 A1 * | 3/2012 | Warther | 340/10.1 |
| 2012/0098642 A1 | 4/2012 | Krawczewicz et al. | |
| 2012/0109735 A1 | 5/2012 | Krawczewicz et al. | |
| 2012/0181333 A1 | 7/2012 | Krawczewicz et al. | |
| 2012/0211569 A1 | 8/2012 | Krawczewicz et al. | |
| 2012/0217303 A1 | 8/2012 | Krawczewicz et al. | |
| 2013/0162429 A1 | 6/2013 | Pfuhl | |
| 2014/0191851 A1 * | 7/2014 | Warther | 340/10.6 |

FOREIGN PATENT DOCUMENTS

| | | |
|---|---|---|
| EP | 2737820 A1 | 6/2014 |
| GB | 2500054 A | 9/2013 |
| WO | 2006052422 A2 | 5/2006 |
| WO | 2006122300 A2 | 11/2006 |
| WO | 2007011514 A2 | 1/2007 |
| WO | 2011/093780 A1 | 8/2011 |
| WO | 2012/152745 A1 | 11/2012 |
| WO | 2013/039395 A1 | 3/2013 |
| WO | 2014/013439 A1 | 1/2014 |

OTHER PUBLICATIONS www.ier.fr 2007 © Discussion of Air Transportation and baggage handling. 8 pages.
High Definition Printing t™ for Maximum Security Identification Cards. Technology White Paper. 2008. HID Global. 4 pages. www.hidglobal.com.
Alien Company home page discussing Radio Frequency Identification (RFID) products at 2009 ©.
www.Alientechnology.com home page. 2007 ©.
ISO/IEC; "International Standard—ISO/IEC 7811-2—Identification Cards—Recording Technique", Part 2, Reference No. ISO/IEC 7811-2-1995(E); 17 pages; (Second Edition Aug. 15, 1995); Geneva, Switzerland.
Office Action issued Aug. 8, 2012 in U.S. Appl. No. 11/967,502.
Office Action issued Oct. 3, 2012 in U.S. Appl. No. 13/290,559.
Office Action issued Apr. 11, 2012 in U.S. Appl. No. 13/290,559.
Office Action issued Feb. 21, 2013 in U.S. Appl. No. 13/290,559.
Office Action issued Aug. 19, 2013 in U.S. Appl. No. 13/290,559.
"Near Field Communication," retrieved from the internet at www.wikipedia.com, (Oct. 16, 2012).
The Next Big Thing in Tech? Here are 7 Ideas by John Brandon on Mar. 24, 2014, 3 pages. http://www.inc.com/john-brandon/7-tech-innovations-coming-this-year-or-early-next.html.
"Digital Bag Tags Could Make Paper Luggage Tags Obsolete" by Harriet Baskas on Nov. 13, 2013, 3 pages. http://www.nbcnews.com/travel/digital-bag-tags-could-make-paper-luggage-tags-obsolete-2D11582680.
Office Action issued Oct. 22, 2014 in U.S. Appl. No. 14/207,836.
Int'l Search Report issued Jun. 24, 2015 in Int'l Application No. GB1423111.2.

* cited by examiner

SMART DEVICE PROGRAMMABLE ELECTRONIC LUGGAGE TAG

CROSS-REFERENCE TO RELATED APPLICATIONS

This application is a Continuation-in-part of U.S. patent application Ser. No. 14/207,836 filed Mar. 13, 2014, which is a Continuation of Ser. No. 13/290,559 filed Nov. 7, 2011, which is a Continuation-in-part of Ser. No. 12/960,941 filed Dec. 6, 2010 and now U.S. Pat. No. 8,052,061, which is a Continuation-in-part of Ser. No. 12/416,636 filed Apr. 1, 2009 and now U.S. Pat. No. 7,845,569. It is related to U.S. Patent Application Nos. 61/891,666 filed Oct. 16, 2013, 61/920,574 filed Dec. 24, 2013, 61/942,917 filed Feb. 21, 2014, 61/970,137 filed Mar. 25, 2014, 62/016,874 filed Jun. 25, 2014, 62/034,563 filed Aug. 7, 2014, 62/049,032 filed Sep. 11, 2014 and Ser. No. 29/497,596 filed Jul. 25, 2014. All of the above-identified applications are incorporated by reference herein in their entireties.

BACKGROUND OF THE INVENTION

The present invention relates to reusable luggage tags.

Travelers are encouraged to tag their suitcases and other luggage to assist in owner identification. Many travelers use permanent tags with personal information printed or hand written. Some bags are equipped with viewing compartments configured to receive a conventional business card carrying the same information. Virtually all airlines request travelers to mark their bags. Most airlines will even provide travelers with disposable tags on which the traveler can provide personal identification and contact information if the traveler's bags do not include their own tags.

One major drawback of such tags is that they are not integrated into airline baggage handling/management systems, which utilize special, machine readable (optically scanned) disposable tags applied by the airlines to each piece of baggage given over to the airline to transport.

Another major drawback is that the machine readable disposable tags applied by the airlines are not reusable. Discarded machine readable luggage tags create over a million pounds of waste per year.

It would be beneficial to provide a permanent luggage tag that could be used repeatedly by travelers and be capable of integration into carriers' baggage handling/management systems for simultaneous reuse by one or more carriers.

BRIEF SUMMARY OF THE INVENTION

In one aspect, the invention is a programmable luggage tag comprising: a bistable, programmable electronic visual display assembly including a display screen; a radio receiver; a processor operably connecting the display assembly with the radio receiver so as to permit reprogramming of an image shown on the screen in response to image commands received through the radio receiver; a case having first and second opposing major outer sides, the case containing the display assembly, the radio receiver and the processor and the first major outer side of the case having a through opening revealing the display screen; a planar flap fixedly connected directly with the case so as to extend outwardly away from the case from between the opposing major outer sides; at least a first, closed perimeter, tag mounting opening extending completely through the flap including first and second opposing major planar sides of the flap; and a radio frequency identification transponder assembly encapsulated between the first and second opposing major planar major sides of the flap.

In another aspect, the invention is a programmable luggage tag comprising: a first component including a planar flexible sheet core having major planar opposing first and second sides, the core including at least first and second core strips of flexible, microporous polymer material fixedly and permanently joined together, microporosity being provided by pores located substantially throughout the microporous polymer material; a first RFID transponder assembly operating at a first frequency integrally embedded between the first and second core strips, the first transponder assembly including at least a non-volatile memory containing a non-alterable permanent code uniquely assigned to the transponder assembly; a separate case permanently secured with a portion of the first component; an electronic bistable visual display assembly within the case, the display assembly including a display screen visible through the case; and a communication link within the case configured for data connection with an external smart device also having communication connectivity with a remote data source over a public wireless communication network, the communication link being configured for receiving data from the smart device to alter an image being displayed by the display.

In yet another aspect, the invention is a programmable luggage tag comprising: a bistable, programmable visual display assembly including a display screen; a short range, non-network radio receiver; at least one processor operably connecting the display assembly with the radio receiver so as to permit reprogramming of the image shown on the screen in response to commands received through the radio receiver; a battery power supply; a manual input device configured to selectively connect the battery power supply with the radio receiver and the processor; and a radio frequency identification transponder assembly operating independently of the display, radio receiver, processor, battery power supply and input device.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

DETAILED DESCRIPTION OF THE INVENTION

Certain terminology is used in the following description for convenience only and is not limiting. The words "right,"

"left," "lower" and "upper" designate directions with respect to components in the drawings to which reference is made. The words "inwardly" and "outwardly" refer to directions toward and away from, respectively, the geometric center of the stated component and designated parts thereof. The terminology includes the words above specifically mentioned, derivatives thereof and words of similar import.

FIGS. 1-4 depict a first exemplary embodiment, smart device programmable luggage tag with RFID transponder assembly and wirelessly reprogrammable electronic visual display according to the present invention and indicated generally at 10. Tag 10 has two distinct parts, a first, rigid, hollow housing component indicated generally at 12 and a second, resiliently flexible, "solid", planar identification flap component (simply "flap") indicated generally at 14.

Figure 4:
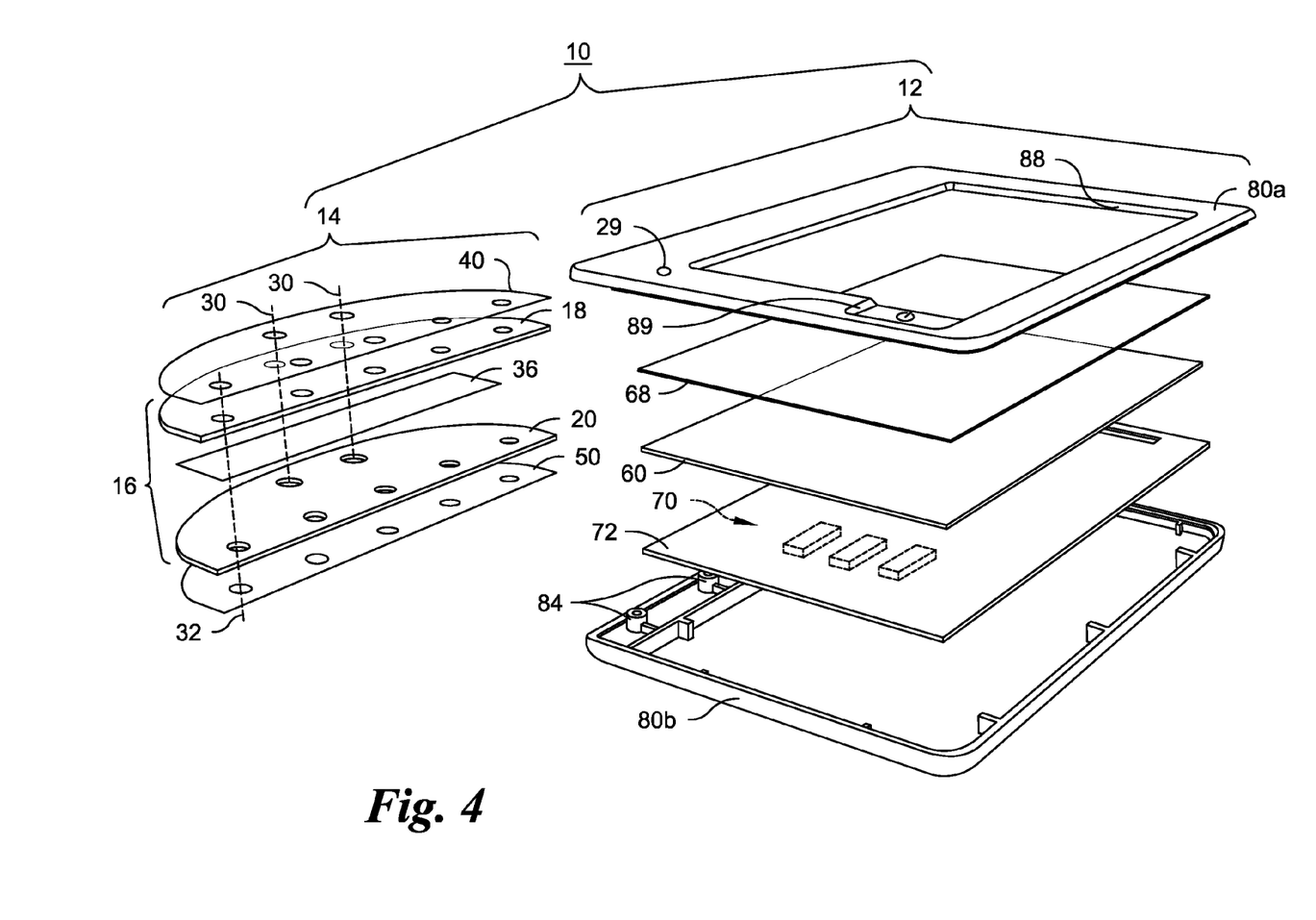
FIG. 4 is a diagrammatic exploded view of the tag of FIGS. 1-3.

The first component 12 is provided by a protective case 80. Referring to FIG. 4, case 80 is a multi-piece shell, two pieces 80a, 80b being shown. Preferably the case components are made of a high impact plastic like high-impact polystyrene (HIPS) or acrylonitrile butadiene styrene (ABS), a metal like an aluminum, or a combination of polymer and metal pieces. The first component 12 further includes a programmable, electronic visual display assembly indicated generally at 60 with a display screen 62, and other circuitry indicated generally at 70 on a hidden side of a supporting circuit board 72, which are all received and housed in the case 80. The display screen 62 is visible through a window 88 in the first/front shell piece 80a. A recess 87 is provided along an edge of the window 88 for a manually activated input device 73 (in phantom). For protection, at least the screen 62 of the display 60 can be covered with a transparent polycarbonate sheet 68 and that sheet provided with an additionally protective and reflection resistant (anti-glare) coating(s) to enhance readability of the display by optical scanners.

Still referring to FIG. 4, the second component or flap 14 of the tag 10 includes a planar sheet core indicated generally at 16 which has opposing, outer major planar sides. The core 16 is preferably formed by at least first and second flexible polymer core strips 18, 20, at least one and preferably both of which are of a microporous material like PPG Industries Teslin®. Core strips 18, 20 are permanently bonded together completely around at least one radio frequency identification (RFID) transponder assembly 36, encapsulating and sealing the assembly 36. The assembly 36 is provided by an antenna and circuitry (not separately depicted). When provided pre-assembled on a polymer substrate ready for use, it is referred to as an inlay. Preferably, the RFID transponder assembly 36 is passive with an ultra-high operating radio frequency (UHF), for example, an Avery Dennison model AD-233m5 inlay. Passive RFID transponder assembly 36 is powered only from an external interrogation signal. At least a first and preferably a second transparent, flexible, nonporous polymer cover strip 40 and 50, respectively, is permanently bonded to the respective exposed front and rear opposing, outer major planar sides of the core 16. The first and second cover strips 40, 50 are suggestedly polyester film, which provides good strength, wear and soil resistance properties to the outer surface of the flap 14. However, other non-porous polymer sheet materials such as PVC or PC may be considered or preferred for other reasons. This construction of flexible polymer strips gives the flap 14 the thickness and flexible resilience of a conventional credit or debit card. In contrast to the case 80, the flap 14 will have a stiffness with respect to force applied against either of its major planar surfaces less than any given stiffness of the case 80 with respect to force applied to its closed major outer side formed by shell piece 80b. The flap 14 should also be thinner between its opposing major planar sides than any given thickness of the case between its opposing flat major outer sides.

Figure 2:
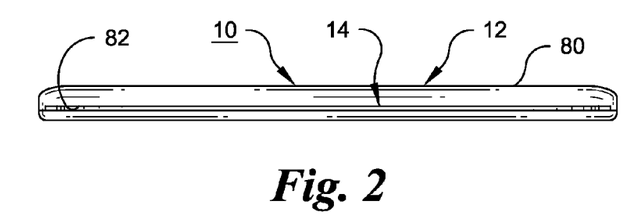
Figure 3:
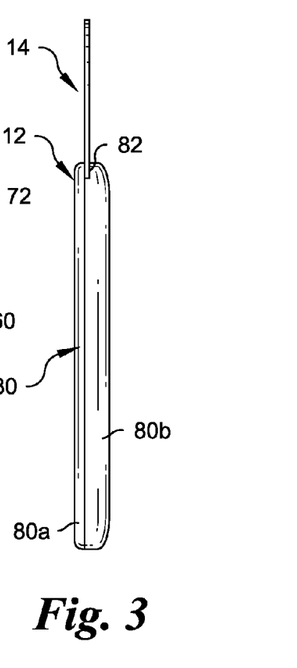

Referring to FIGS. 2 and 3, a slot 82 is provided along one elongated (top) edge of the case 80 to receive a proximal end portion of the flap 14 and join the flap with the case 80. The flap 14 is fixedly secured to the case 80 within the case. Preferably, the flap 14 preferably permanently, fixedly secured within the case 80 by mechanical connection(s), weld(s) or adhesive, or with more than one of those options. More particularly, in the depicted embodiment, the flap is mechanically captured within the case 80 by a series of hollow posts 84 provided adjoining the slot 82 to be received in a plurality of closed perimeter openings or holes 32 provided through the proximal end portion of the flap 14. Unseen pins on the inner side of the first/top shell half 80a are received in the visible center holes in the posts 84 to align and secure the shell pieces 80a, 80b together. The shell pieces 80a, 80b are preferably permanently joined together with an appropriate polymer adhesive and/or a sonic weld, permanently securing the flap 14 to the case 80. Any remaining open area of the slot 82 where the flap 14 protrudes can be sealed in the same fashion while the window 88 and recess 87 of the case 80 providing visual access to the display screen 62 and access to an input device 73 can be sealed by an appropriate polymer adhesive thereby hermetically sealing the display assembly 60 and circuitry 70 within the case 80 and the case 80 with the flap 14. At least one and preferably a pair of closed perimeter, tag mounting openings or holes 30 are provided, each completely through a distal portion of the flap 14 including the first and second major planar sides of the flap, remote from the case 80, for purposes as will be explained.

The core strips 18, 20 might be printed upon before or after assembly into the core 16. The printing can include non-variable images such as logos, trademarks or other source identifiers, use instructions, background graphics, etc. that do not vary from tag to tag in a collection of such tags. Either of the core strips 18, 20 (or the cover strips 40, 50) may also be printed with a unique identification code, for example, a unique identifier like the permanent identification code assigned to the RFID transponder assembly by the inlay or circuit chip manufacturer to uniquely identify the assembly/inlay. That number is loaded into non-volatile memory of the assembly, is non-alterable and transmitted by the assembly in response to an interrogation signal to identify the assembly to the interrogator. The flap may be printed with a 2D bar code like that illustrated in FIG. 10, which will permit a passenger to access a carrier via a suitably equipped cell phone (at least a camera and appropriate bar code reading and responding application).

Separating the RFID transponder assembly 36 in the flap 14 from the display 60 and circuitry 70 in the case 80 provides several benefits. It permits the separate manufacture of the second component 14 by conventional, high speed, lower cost, cold lamination and printing processes typically used in credit/debit card and RFID tag and card manufacture. The RFID transponder assembly 36 is encapsulated between the core sheets 18, 20 and laminated within the outer cover strips 40, 50 without subjecting the inlay to the temperatures and pressures to injection molding processes used to manufacture a hard polymer case 80, in which such inlays have been installed by others.

The RFID transponder assembly 36 in this construction is further electrically and functionally isolated from the display 60 and other circuitry 70, including any power supply and metal in the case 8 to minimizes possible interference with the operation of the RFID transponder assembly 36. For example, even if the case were all plastic, many electronic visual display assemblies are provided with a metal backing plate which, if positioned over the assembly 36, could degrade its effective range.

Teslin® is a microvoided/microporous polysilicate sheet material of the type described in detail in U.S. Pat. No. 4,861,644 incorporated by reference herein. This polysilicate material is relatively very porous with an essentially uniform porosity throughout of greater than thirty percent by volume, more typically forty-five to sixty percent in commercial grades, and an average pore size of about one micron or less. Microvoided/microporous, polysilicate sheet material is suitable for various types of printing including laser printing although other commercially available, printable synthetic paper products might be used as the core strips.

Microporous polysilicate sheet material itself provides several additional distinct advantages. It is waterproof and durable. The preferred core strips of microporous polysilicate material wrap and mechanically protect the inlay 36 better than any known non-porous polymer material or paper. The microporosity of the flexible polysilicate sheet material acts as a cushion and even permits the material to collapse/compress over the chip or other circuitry of the assembly 36 thereby reducing inherent stress on the assembly 36 in the core 16. It is also considerably more durable than PVC and/or PE commonly used in RFID cards and tags, withstanding flexing and high mechanical pressure and without cracking, peeling or delaminating over wide operating and mechanical stress ranges, increasing the useful life of the flap 80 several fold over tags made with other non-porous polymer core materials.

Microporous polysilicate sheet further provides enhanced electrical performance properties including a 2-3 dB increase in RF signal propagation read range, which translates into approximately doubling the operating range of the RFID transponder assembly 36 compared to an identical assembly embedded in conventional, non-porous polymer (e.g. PC, PVC or PET) materials. It also provides faster static decay times and has lower surface resistivity than PVC, PET and PC, thereby providing superior static dissipative qualities compared with PVC and/or PE core materials typically used in RFID tags.

Figure 5:
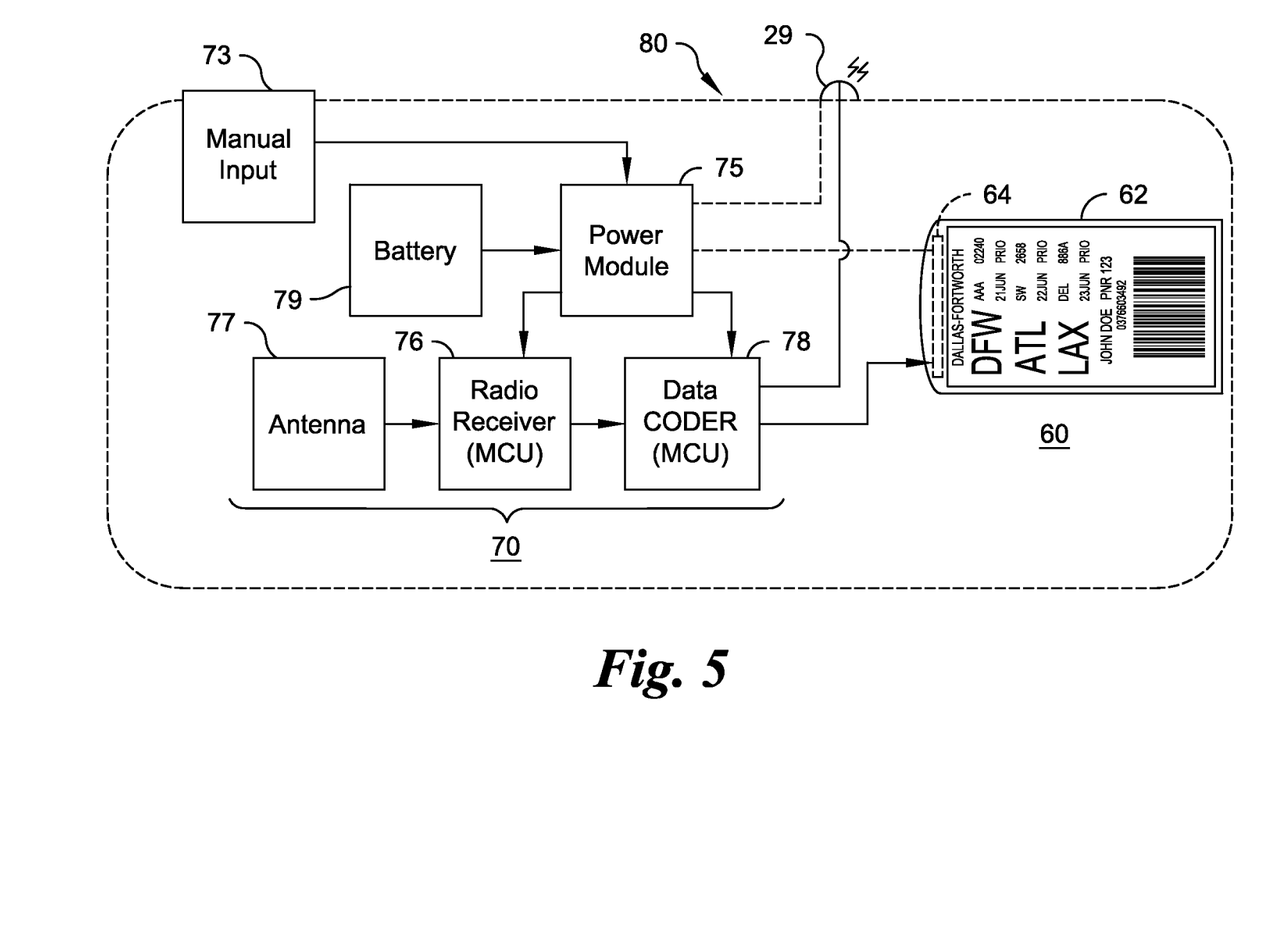
FIG. 5 is a diagrammatic view of the electrical components associated with the programmable bistable electronic display.

The display assembly 60 and other circuitry 70 housed in the case 80 are depicted in functional block diagram form in FIG. 5. The display assembly 60 includes, in addition to the physical screen 62, driver circuitry 64 which is used to generate the image resident on the screen 62. The other circuitry 70 includes a manual input device 73 that activates the remainder of the other circuitry 70 for programming/reprogramming the image of the display 60. Device 73 is preferably a mechanical switch that provides tactile feedback to the user but capacitive switches and other types of devices may be used. Device 73 causes electricity from an on-board battery power supply 79 to pass through a power module 75, which is configured to generate power supplies at appropriate voltages to operate the remaining circuit components and to interface with the driver circuitry 64 of the display 60. These remaining components includes at least a wireless signal receiver 76 operably connected with an antenna 77. It will be appreciated that the other circuitry 70 includes at least one processor for controlling operation of the other components of the other circuitry to program/reprogram the display assembly 60. It will further be appreciated that the control function may be divided among several processors, each performing only a limited function. For example, the wireless signal receiver 76 may include a micro control unit (MCU) to interface with the source of wireless/radio image control signals transmitted to the tag 10 to program/reprogram the display 60. A coding engine (DATA Coder) 78 may be provided as a separate module operably connected between the wireless signal receiver 76 and the display driver circuitry 64 with its own MCU configured to convert radio control signals received from the wireless control signal source (i.e. the smart device) through the receiver into command signals suitable for the driver circuitry 64. Alternatively, the receiver and coding engine might be combined in a single module with a single processor performing the necessary functions or the driver circuitry 64 may be "smart", with a processor configured to assume the functions of the coding engine 78 and configured so as to interface directly with the wireless signal receiver 76. Finally, an LED 29 has been provided, visible through the front piece 80a of case 80, which is lit by some processor for a predetermined period of time after components of the other circuitry 70 is activated through the manual input device 73 to notify the user that the circuitry 70 is active and will remain active for a period of time (e.g. 20-30 seconds) awaiting an image control signal from the wireless control signal source (i.e. the smart device). The LED 29 is extinguished when the circuitry 70 goes dormant at the end of the period.

The electronic visual display assembly 60 is preferably a bistable passive reflective display assembly like a sheet of flexible electronic paper ("E-paper" or "e-ink") or one of the newer, "zero power" LCD displays. Truly bistable visual displays require no continuing power to maintain an image. If the display is bistable as preferred, the battery power supply 79 is needed only to power the other circuitry 70 to receive image coding instructions and change the image of the display 60. The bistable display 60, once programmed or reprogrammed, will retain its image without further power usage. Under these conditions, a "coin" type cell battery (not depicted) would be sufficient to power literally thousands of activations and display reprograms.

Types of commercially available, bistable displays include: cholesteric liquid crystals (ChLC) on a flexible thin film, electrophoretic, electrowetting and electrofluidic displays using charged pigment particles, water oil mixtures and aqueous pigment dispersions, respectively. More recently, E Ink Corporation has made commercially available a variety of "electronic paper displays" (EPD), extremely thin and flexible, in both active (thin-film-transistor liquid-crystal) and segmented configurations that might be used. This list is suggestive and not intended to be or to be considered to be all inclusive or otherwise exclusive. Moreover, while flexible displays are lighter and thinner, they are more expensive than glass mounted EPD's and the latter provide can provide better contrast to improve optical scanning accuracy.

Such displays can be externally programmed/reprogrammed to exhibit conventional luggage tag coded information normally provided by airlines on the paper tags currently used to identify and route passenger luggage. Most importantly, this is itinerary information and a carrier's baggage management system code number, a passenger name record (PNR), a reservation number or other unique record identifier or locator used by the carrier to identify the passenger and itinerary in a central data base used by the carrier. The tag 10 may include other variable data (e.g. passenger name, number of checked bags or items, etc.) that would differ in content from tag to tag of different passengers or even between tags of the same passenger.

Figure 9:
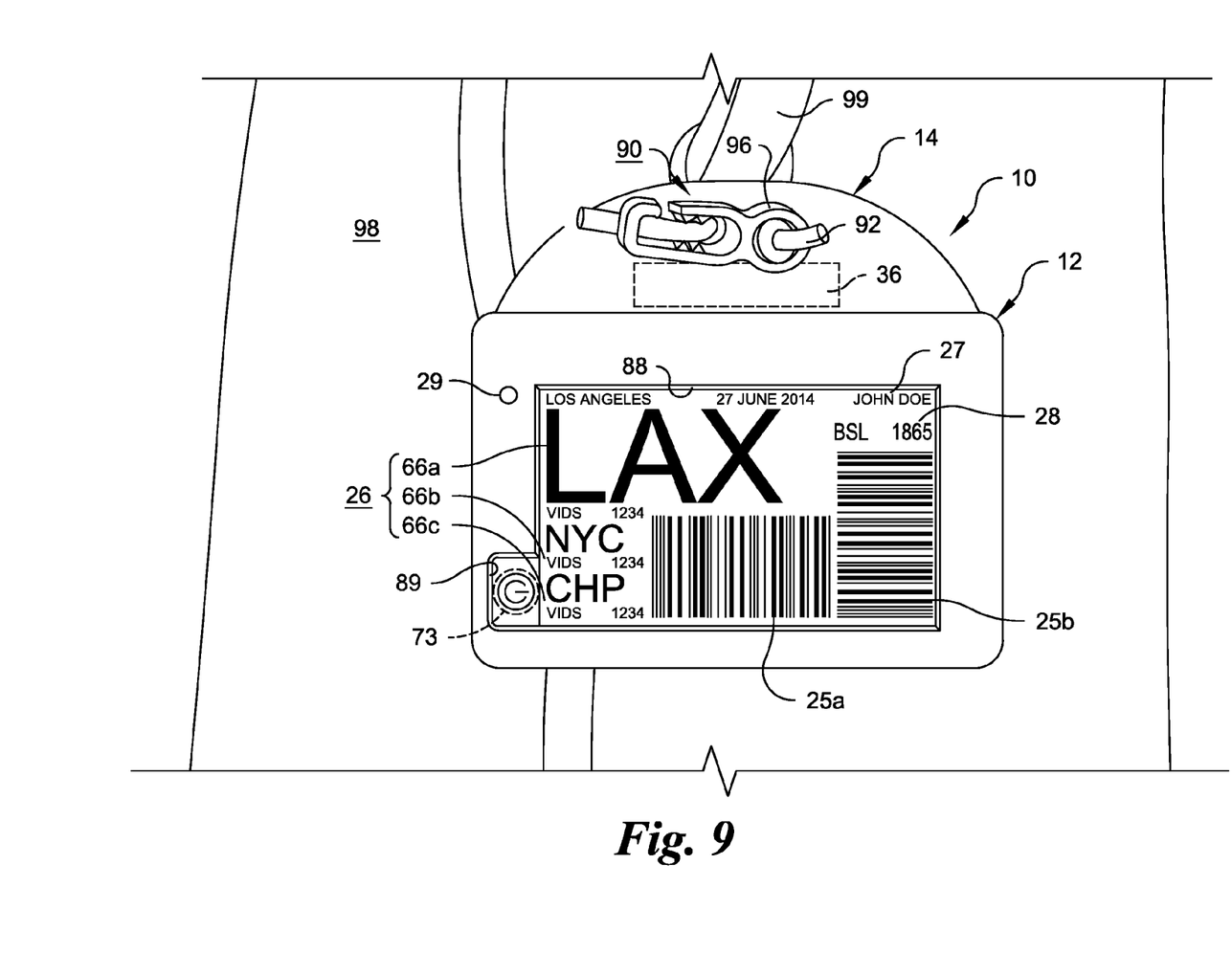
FIG. 9 depicts the first embodiment tag of FIGS. 1-8 secured to a piece of luggage.

In FIG. 9, two, identical, one-dimensional baggage management system bar codes 25a, 25b are displayed at right angles for convenient use with the optical scanning baggage system equipment conventionally used by airlines. The display on the screen 62 in FIG. 1 further includes, for example, alpha-numeric itinerary data indicated generally at 26 and unique identification information such as the user's name 27. Itinerary data 26 include: flight date (27 Jun. 2014); 66a—a destination airport name; 66b—an originating airport, 66c-a connecting or stop-over airport between 66a and 66b. In each instance, the airport abbreviation, the airline abbreviation (VIDS) and flight number (1234) are displayed. With the user's name 27 is a Passenger Reservation No. 28 (BSL 1865), which is another way to access itinerary and passenger information in a carrier's remote data base.

The wireless image control signal source is a suitably configured and programmed smart device. Currently, smart phones are the wireless control signal sources of choice and Bluetooth Low Energy (BLE) the signal format of choice as virtually all smart phones becoming available are equipped for at least BLE communication. However, other types of "short range" wireless communication formats might be used as an alternative, for example, Near Field Communication (NFC) formats, and other short range communication formats that might become available in the future.

It should be appreciated that the tag 10 lacks direct public cellular network and/or internet connectivity capability, through either a public cellular network or a wireless local area network (i. e. WLAN/Wi-Fi). All such connectivity of the tag 10 is through a smart phone or other public network connection enabled device that is also enabled for short range communication with the tag. "Long range" communication refers to the normal inherent wireless communication capability provided to cell phones including smart phones to connect with a wireless public cellular communication network. It is also includes other private network communication capabilities that might be provided in a cell phone or smart device such as Motorola MOTO talk, a direct radio communication capability, which has a range in the kilometers. "Short range" communication refers to a separate, additional communication capability and format provided in certain smart phones and other smart devices having wireless public cellular, Wi-Fi and/or WLAN network communication capability. BLE communications are designed to have a nominal range of about fifty meters, half that of conventional Bluetooth communication. NFC has a nominal range of a fraction of a meter (practical working distance being reported to be about 4 cm or about ½₅ meter). Other short range, non-public, non-network wireless communication protocols and equipment may become widely available in the future to supplant or upgrade Bluetooth, BLE and/or NFC and are intended to be covered by the invention.

In use, an appropriate app would be provided by a carrier or other third party to a passenger to load into the passenger's smart phone or other smart device with public communication network capability. When the passenger wanted to program/reprogram the tag 10, the app would be activated in the smart device by the passenger to automatically contact a remote data base designated by the carrier through the app, via a public communication network accessible to the smart device, such as a public cellular network or the internet. The app would uniquely identify the passenger to the remote data base. The remote data base would then identify and transfer to the smart phone/device, data from a currently or previously created itinerary stored in or available to the remote data base. The app would then wirelessly transmit the display data from the smart phone or other smart device in an appropriate format (preferably BLE) to the wireless receiver 76 to update the display 60.

Figure 6:
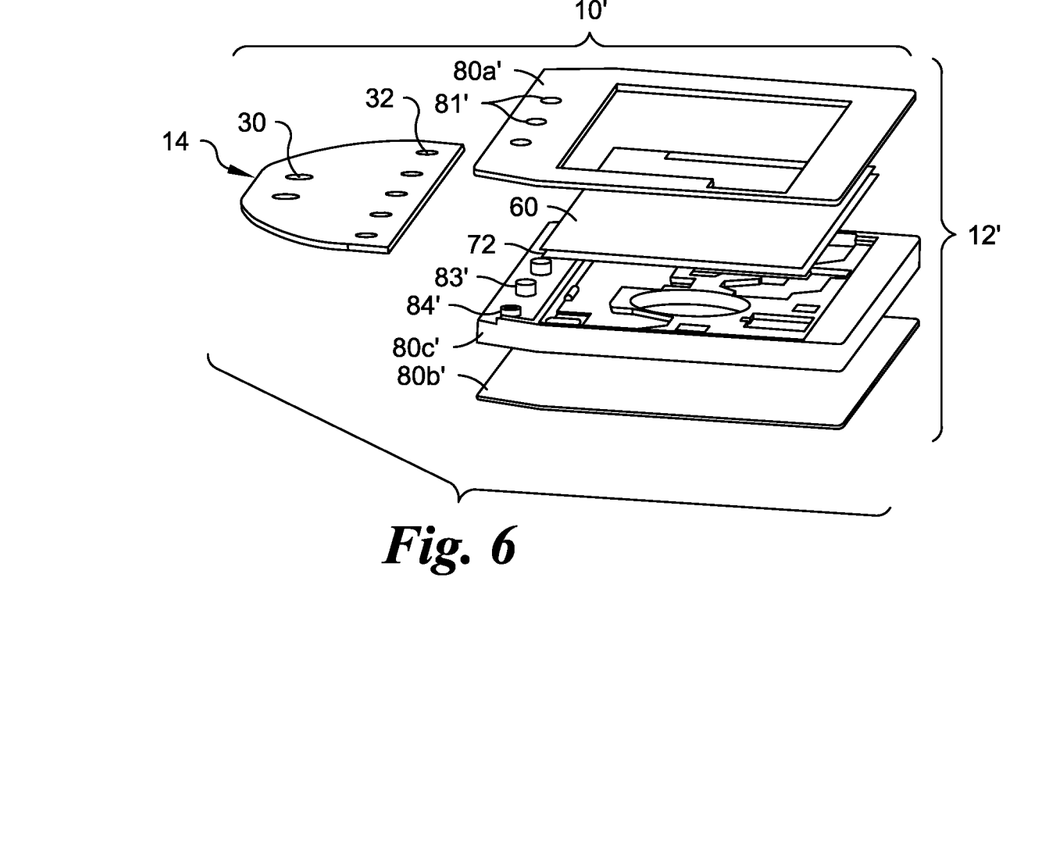
FIGS. 6 and 7 are top and bottom perspective exploded views of an alternate construction of part of the luggage tag embodiment of FIGS. 1-4.
Figure 7:
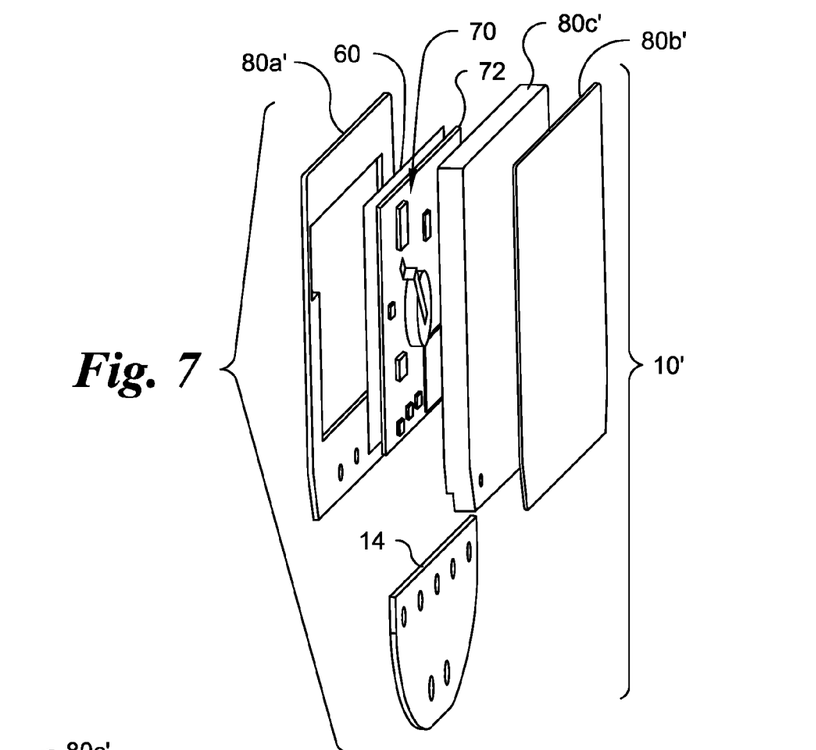
Figure 8:
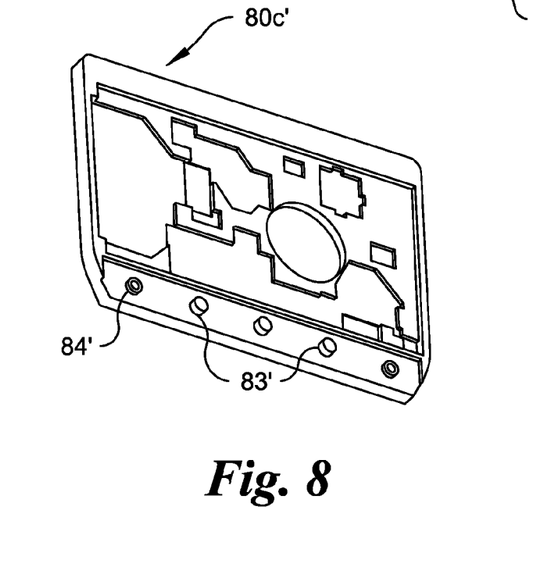
FIG. 8 is a perspective view of the intermediate piece of the revised case configuration of FIGS. 6 and 7.

FIGS. 6-8 depict a modified luggage tag 10' with a possible alternative construction of the first component 12' case indicated here at 80'. The construction of the second component 14 remains the same. Case 80' is a three piece assembly 80a', 80b', 80c' which again receives and houses the programmable, bi-stable, electronic display assembly 60 and other circuitry indicated generally at 70 on circuit board 72. Front and rear covers 80a' and 80b' are metal, e.g. an aluminum or steel, for strength and rigidity. These pieces are flat or substantially flat so that they can be stamped from planar sheet blanks.

The center piece 80c', called a "pillow", is preferably molded plastic. It is provided with a number of hollow posts 84' and solid pins 83', which are to be received in the openings 22 of the flap 14 to mechanically secure the flap 14 with the hard case 80'. The top piece 80a' may be provided with openings 81' to receive one or more of the pins 83', three being accommodated in the views but greater or lesser numbers might be used, to mechanically secure the third piece 80c' with the first 80a'. The pillow 80c' accommodates the circuitry 70 on a facing side of the board 72, which is opposite the side of the board 72 facing the back of the display assembly 60. The pillow 80c' is designed to support the circuit board 72 with a "yin-yang" approach: "valleys" of the pillow 80c' are sized and located to accommodate components of the circuitry 70 protruding from the board 72 thereby providing a protective space around the board mounted components. "Peaks" of the pillow 80c' are provided around and between the valleys and the individual components of the circuitry 70 so as to come into intimate contact with the facing surface of the circuit board 72. Not only does this support the board 72 to limit its flexure, it also supports the back of the display 60, through the board, thereby limiting flexure of the display as well. This is important because it permits the use of a glass mounted display, which is normally susceptible to damage from even modest flexure. Glass mounted displays are several times less expensive than plastic mounted displays of the same design and operational capability. However, prior attempts to incorporate glass mounted displays into luggage tags have met with failure when tested in a typical, luggage handling environment.

Figure 1:
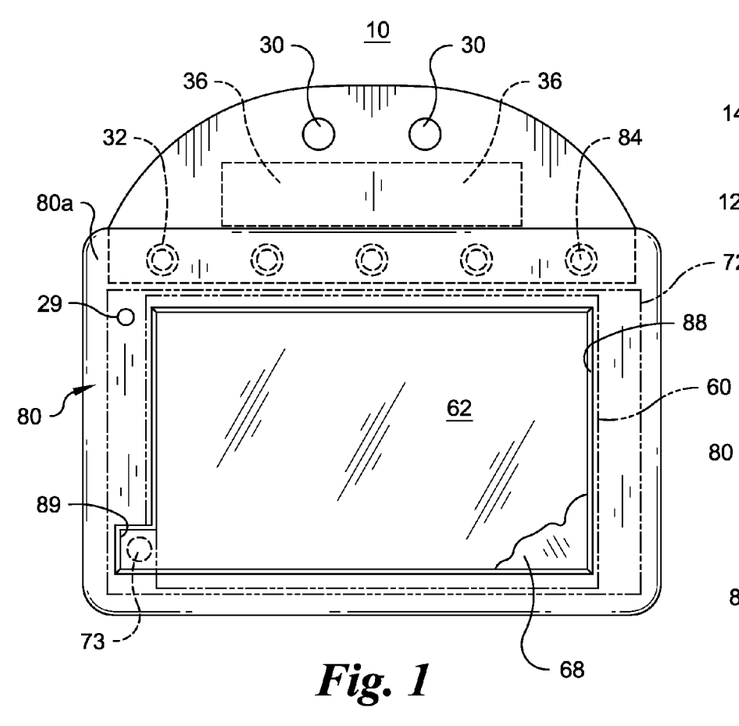
FIGS. 1-3 are front, side and top view, respectively, of a first embodiment luggage tag according to the invention.

Referring to FIGS. 1, 4 and 9, the pair of closed perimeter holes 30 provided, each entirely through a distal portion of the flap 14 remote from the case 80, are sufficiently close together to enable the tag 10 or 10' to also be secured tightly to the handle portion 99 of a bag 98, without turning movement, in a "license plate" position as depicted. This configuration eliminates the need for a second programmable display on the second side of the tag to generate another image of a baggage management/handling system bar code as the tag 10, 10' will always be located in a position to read its first side display 60. By locating the tag on a handle at an edge/end of the bag, the tag is also less likely to be damaged by collision with other bags during loading and unloading operations.

The tag 10, 10' is preferably secured to the handle 99 by an attachment device indicated at 90 including an elastomeric member 92 in the form of a single length of elastic shock or "bungee" cord, and a one-piece receiver/stop 96. The receiver/stop 96 has three parallel bores. A first or working end of the cord 92 is passed in one direction through a first bore, through one of the distal, closed perimeter openings 30 of the tag 10, around the handle 92, back through the second closed perimeter opening 30 and through a second bore of the receiver/stop 96 adjoining the first bore. Finally the working end is passed through the third bore which includes serrations or like mechanical structures that grab and retain the working end of the member 92 to retain the member 92 stretched, under tension. Either end of the cord 92 might be knotted to prevent the end from slipping through its receiving bore.

Figure 10:
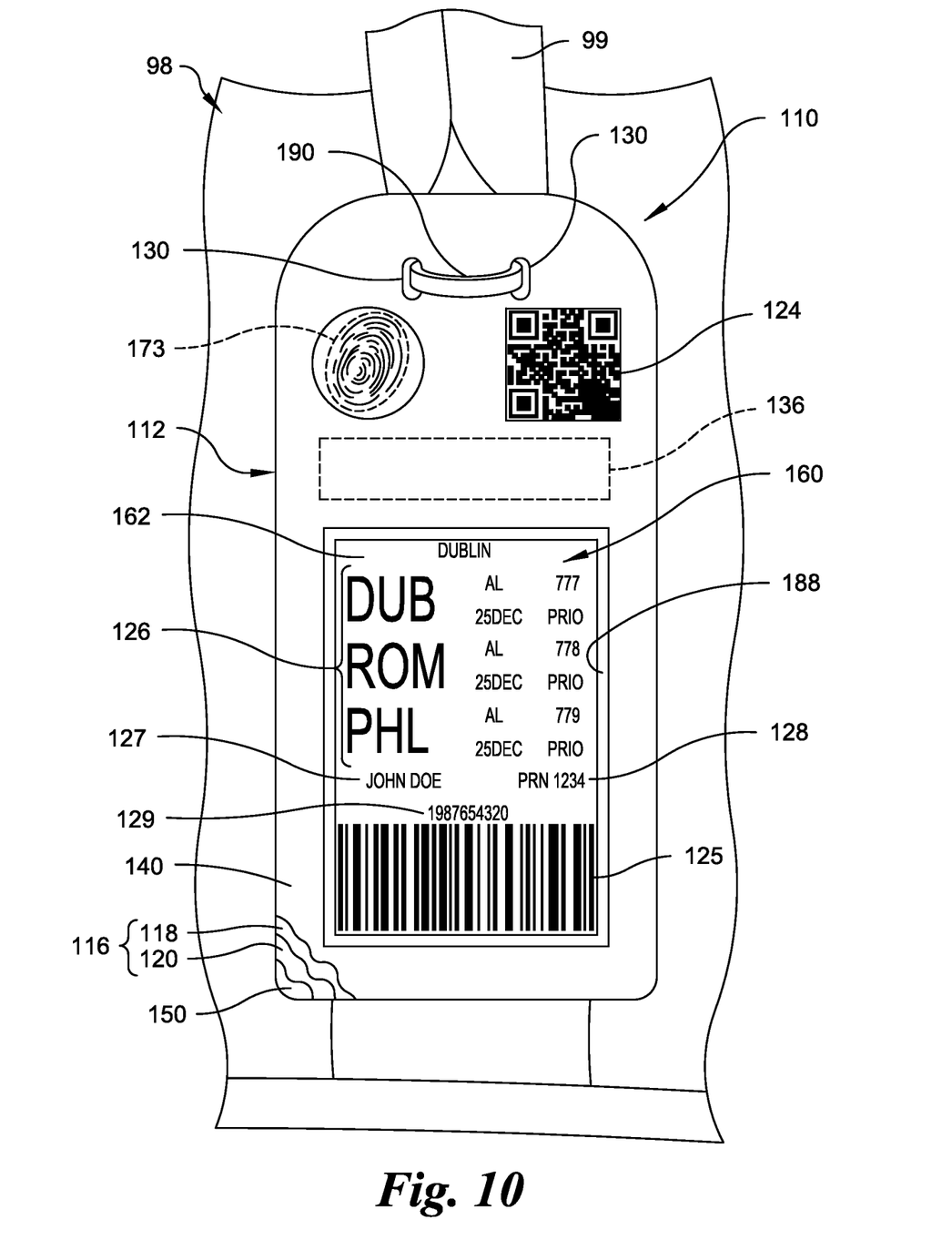
FIG. 10 is a front elevation of a second embodiment luggage tag according to the present invention secured to a piece of luggage.

FIG. 10 depicts an alternate luggage tag embodiment with RFID transponder assembly and wirelessly programmable/reprogrammable electronic display according to the present invention and indicated generally at 110. Tag 110 represents an alternate physical form of the Bluetooth Low Energy (BLE) or similar wireless architecture. Tag 110 contains the same electrical/electronic components of tag 10 but in a single, resilient flexible housing or body 112. Tag 110 includes a planar, flexible sheet core like 116 but coextensive with the entire tag 110. The core 116 is again formed by at least first and second preferably microporous core strips 118, 120, fixedly and permanently joined together around at least one radio frequency identification (RFID) transponder assembly, one flexible, programmable electronic visual display 160, and the other circuitry. At least a first and preferably a second transparent flexible polymer cover strip 140, 150 are integrally and permanently secured to the exposed major front and rear sides of the core 116. The screen 162 of the flexible display 160 is visible beneath the front transparent cover strip through a window 188 cut through front core strip 118. The RFID transponder assembly and other circuitry including a coin battery are located in the core in the area between the display 160 and the two closed perimeter openings 130 at the top end of the tag 110 distal to the display 160. A manual input device, preferably a manually actuated mechanical switch, is indicated in phantom at 173 and is located within the core 116 but may be located between the core 116 and the front cover strip 140. Further details of this construction can be found in the priority documents incorporated by reference at the beginning of this document.

The tag 110 further includes a printed, two dimensional bar code 124 (e.g. QR code) as an alternative means to enable a smart device (e.g. a cell phone with camera) to connect with a remote data base (e.g. Airline Reservation System) containing the user's itinerary and other data for down-loading to the smart device and transfer from that device to the tag 110.

In this embodiment 110, the display 160 has been configured to generate a single baggage management/handling one dimensional bar code 125 in addition to the itinerary data 126, the user's name 127, a Passenger Reference Number 128 (PRN 1234), and an identification code 129 (1987654320) unique to the tag, which may be the identification number of the RFID assembly.

Two closed perimeter holes 130 are again located at one longitudinal end of the tag most distal to the display 60 and are sized to receive a tag attachment device 190, preferably a flexible plastic fastener of the type variously referred to as a zip tie, cable tie, tie-wrap, hose tie or zap-strap. Device 190 does not require any other components to secure the tag 110 tightly to the handle portion 99 of a bag 98 in the so-called license plate position on the bag, which enables the tag to be read by conventional baggage management/handling system optical scanners as the bag travels conveyors.

It is understood, therefore, that this invention is not limited to the particular embodiments disclosed, but it is intended to cover modifications within the spirit and scope of the present invention as defined by the appended claims.

The invention claimed is:

1. A programmable luggage tag comprising:
a bistable, programmable electronic visual display assembly including a display screen;
a radio receiver;
a processor operably connecting the display assembly with the radio receiver so as to permit reprogramming of an image shown on the screen in response to image commands received through the radio receiver;
a case having first and second opposing major outer sides, the case containing the display assembly, the radio receiver and the processor and the first major outer side of the case having a through opening revealing the display screen;
a planar flap fixedly connected directly with the case so as to extend outwardly away from the case from between the opposing major outer sides;
at least a first, closed perimeter, tag mounting opening extending completely through the flap including first and second opposing major planar sides of the flap; and
a radio frequency identification transponder assembly encapsulated between the first and second opposing major planar major sides of the flap.

2. The programmable luggage tag of claim 1 wherein the flap is fixedly secured to the case within the case.

3. The programmable luggage tag of claim 1 wherein only a proximal edge portion of the flap is located and mechanically captured within the case.

4. The programmable luggage tag of claim 1 wherein the case has a given thickness between the first and second opposing major outer sides and wherein the flap has a thickness between the opposing first and second major planar sides less than the given thickness between the opposing major sides of the case.

5. The programmable luggage tag of claim 1 wherein the case has a given stiffness to force applied to the second major side and the flap has a stiffness before connection with the case to force applied to either of the opposing major planar sides of the flap less than the given stiffness.

6. The programmable luggage tag of claim 1 wherein the case is formed from one of a combination of metal pieces, a combination of high impact plastic pieces and a combination of metal and plastic pieces.

7. The programmable luggage tag of claim 1 wherein the display screen is made of glass.

8. The programmable luggage tag of claim 1 wherein the case further contains a battery and an input device exposed sufficiently for manual operation, the input device being configured to operably connect the battery with at least the processor and the radio receiver.

9. The programmable luggage tag of claim 1 wherein the radio receiver and the processor are configured for Bluetooth communication.

10. The programmable luggage tag of claim 1 wherein the radio receiver is configured for operation only at locations less than one hundred meters away from a compatible radio signal source.

11. The programmable luggage tag of claim 1 wherein the radio frequency identification transponder assembly is configured for Ultra High Frequency operation.

12. The programmable luggage tag of claim 1 wherein the radio frequency identification transponder assembly is electrically isolated from the case.

13. The programmable luggage tag of claim 1 wherein the radio frequency identification transponder assembly is located in a portion of the flap physically outside the case.

14. The programmable luggage tag of claim 1 wherein the radio frequency identification transponder assembly is passive and powered only from an external interrogation signal.

15. The programmable luggage tag of claim 1 further comprising a second closed perimeter mounting opening extending completely through the flap including the first and second, opposing major planar sides of the flap, the second closed perimeter opening being located proximal the first closed perimeter opening at an end of the flap remote from the case.

16. A programmable luggage tag comprising:
a first component including a planar flexible sheet core having major planar opposing first and second sides, the core including at least first and second core strips of flexible, microporous polymer material fixedly and permanently joined together, microporosity being provided by pores located substantially throughout the microporous polymer material;
a first radio frequency identification transponder assembly operating at a first frequency integrally embedded between the first and second core strips, the first transponder assembly including at least a non-volatile memory containing a non-alterable permanent code uniquely assigned to the transponder assembly;
a separate case permanently secured with only an edge portion of the first component;
an electronic bistable visual display assembly within the case, the display assembly including a display screen visible through an opening in the case; and
a communication receiver within the case configured for data connection with an external smart device also having communication connectivity with a remote data source over a public wireless communication network, the communication receiver being configured to receive data from the smart device to alter an image being displayed by the display assembly.

17. A programmable luggage tag comprising:
a bistable, programmable visual display assembly including a display screen;
a short range, no-network radio receiver;
at least one processor operably connecting the display assembly with the radio receiver so as to permit reprogramming of the image shown on the screen in response to commands received through the radio receiver;
a battery power supply;
a manual input device configured to selectively connect the battery power supply with the radio receiver and the processor; and
a radio frequency identification transponder assembly operating independently of the display, radio receiver, processor, battery power supply and input device.

18. The programmable luggage tag of claim 17 wherein the display assembly, the radio receiver, the processor, the battery power supply and the manual input device are located together in a single housing.

19. The programmable luggage tag of claim 18 wherein the housing is resiliently flexible and the radio frequency identification transponder assembly is also located within the housing.

20. The programmable luggage tag of claim 18 wherein the housing is made from one of a combination of high impact plastic pieces, a combination of metal pieces, and a combination of metal and plastic pieces, and wherein the tag further comprises a planar flap made from flexible polymer sheet materials, fixedly connected with the housing so as to extend away from the housing, the planar flap containing the radio frequency identification transponder assembly outside the housing.

21. The programmable luggage tag of claim 1 wherein the case further contains:
a battery power supply; and
an input device at least partially exposed on the case for manual activation, the input device being configured to selectively connect the battery power supply with at least one of the radio receiver and the processor in response to manual activation.

22. The programmable luggage tag of claim 21 wherein:
the planar flap has a maximum thickness between the first and second opposing major planar sides less than any given thickness of the case between the first and second opposing major outer sides; and
the case has a given stiffness to force applied to the second major side and the flap has a stiffness before connection with the case to force applied to either of the opposing major planar sides of the flap less than the given stiffness.

23. The programmable luggage tag of claim 22 wherein:
the case is hollow and formed from one of a combination of metal pieces, a combination of high impact plastic pieces and a combination of metal and plastic pieces; and
the planar flap is a solid lamination and includes at least first and second core strips of flexible, microporous polymer material fixedly and permanently joined together around the radio frequency identification transponder assembly, microporosity being provided by micron sized pores located substantially throughout the microporous polymer material.

24. The programmable luggage tag of claim 23 wherein:
the case is formed by two outer cover pieces and a center piece located between the two outer cover pieces, the center piece being configured to at least support and limit flexure of the display assembly within the case; and
only a captured proximal edge portion of the planar flap is located within the case and the radio frequency identification transponder assembly is located within a portion of the flap physically outside of the case.

* * * * *